United States Patent [19]

Abe et al.

[11] 4,289,183
[45] Sep. 15, 1981

[54] NOISELESS LUG TIRES

[75] Inventors: Masaru Abe, Sayama; Yoshihiro Sakai, Kawasaki; Yasutaka Enoki, Higashimurayama; Noriyasu Sawada, Mitaka, all of Japan

[73] Assignee: Bridgestone Tire Company Limited, Tokyo, Japan

[21] Appl. No.: 107,740

[22] Filed: Dec. 27, 1979

[30] Foreign Application Priority Data

Jan. 13, 1979 [JP] Japan .................................. 54/3190

[51] Int. Cl.³ .............................................. B60C 11/04
[52] U.S. Cl. ............................ 152/209 B; 152/209 A
[58] Field of Search ........... 152/209 R, 209 B, 209 A, 152/209 D; D12/140, 149, 151

[56] References Cited

U.S. PATENT DOCUMENTS

| 1,956,011 | 4/1934 | Evans | 152/209 R |
| 2,808,867 | 10/1957 | Buddenhagen et al. | 152/209 R |
| 3,926,238 | 12/1975 | Vorih | 152/209 R |
| 4,178,199 | 12/1979 | Lippman et al. | D12/147 |

OTHER PUBLICATIONS

U.S. Royal Fleetmaster, United States Rubber, 1959.

Primary Examiner—Michael W. Ball
Attorney, Agent, or Firm—Sughrue, Mion, Zinn, Macpeak & Seas

[57] ABSTRACT

A noiseless lug tire which runs at a high speed under a heavy load and which satisfies the following conditions.
(1) A ratio $W_g/W_l$ is equal to or smaller than 1.0.
(2) Each transverse groove for delimiting lugs is not inclined toward an opening of the transverse groove at the kickout side of each lug.
(3) Each transverse groove is inclined toward the opening at the stepin side of each lug at an angle of at most 22°.
(4) Each portion of a center line of the transverse groove in a substantially total region of a length L of the transverse groove is inclined with respect to the meridian line of the tire at an angle within a range from at most 15° measured in a direction opposite to the inclination direction of the transverse groove as a whole to at most 60° measured in the same direction as the inclination direction of the transverse groove as a whole.
(5) Each portion of the center line of the transverse groove in a region extending at least 60% of the length L of the transverse groove is inclined with respect to the meridian line of the tire at an angle within a range from at most 2° measured in the direction opposite to the inclination direction of the transverse groove as a whole to at most 30° measured in the same direction as the inclination direction of the transverse groove as a whole.
(6) The inclination of the transverse groove as a whole toward the opening thereof in a region extending from the inner end of each transverse groove to a position which is at least 75% of the length L of the transverse groove and at the stepin side of each lug is increased in response to the advance of tread wear.

5 Claims, 38 Drawing Figures

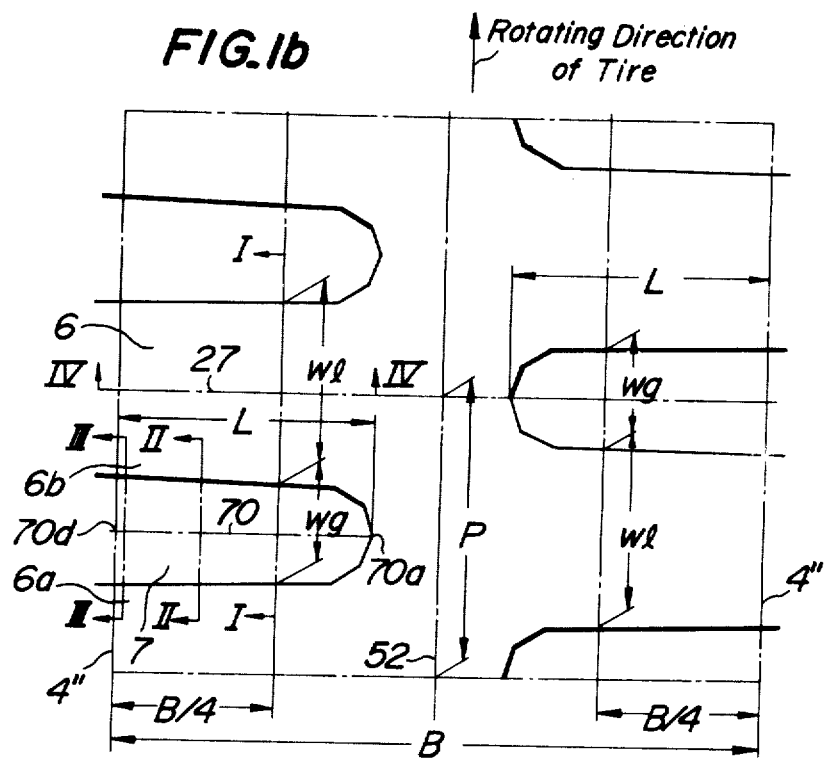

Rotating Direction of Tire

Rotating Direction of Tire

Rotating Direction of Tire

Rotating Direction of Tire   FIG.11a
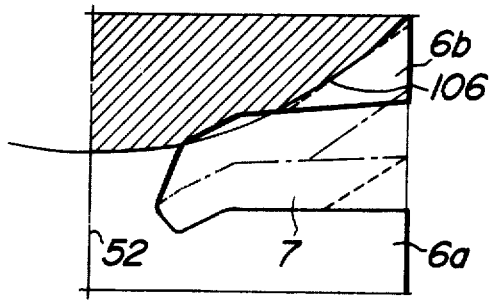
Rotating Direction of Tire   FIG.11b
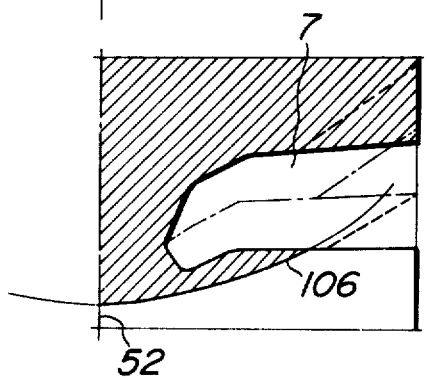

NOISELESS LUG TIRES

BACKGROUND OF THE INVENTION

1. Field of the Invention

This invention relates to pneumatic tires and more particularly to an improvement in a pneumatic tire adapted for use in an automobile which runs at a high speed under a heavy load such, in general, as trucks, buses or trailers, all inclusive of middle type and small type, particularly a noiseless lug tire having a lug type tread pattern.

2. Description of the Prior Art

The above mentioned kind of pneumatic tire is required to have not only an excellent durability represented by resistance to wear, separation resistant property, burst resistant property or the like and an excellent dynamic ability represented by antiskid property, steering stability, rolling resistance or the like but also an excellent low noise property for the purpose of improving environmental conditions.

In order to maintain or improve a safe property of the tire, it is a matter of course that the low noise property must be improved without degrading the steering stability, antiskid property and durability.

In general, however, the low noise property is contradictory to both the durability and the dynamic properties. In addition, the durability is contradictory to the dynamic property.

As a result, it is an important problem in the techniques associated with the tire to provide a tire which can simultaneously eliminate a contradiction among these three properties and which has not only an excellent low noise property but also an excellent dynamic property and durability.

It is a matter of course that a rib type tread pattern is fundamentally useful when a low noise property is required while satisfying the desired dynamic property. But, when the rib tire is used under heavy load or a non-paved road or off-road where rocks and stones are scattered or used under any other severe conditions, rib tear, groove crack or groove base cut or burst due to stones biting into the groove and particularly a separation failure of the internal reinforcement due to overheat near the shoulder which are inherent to the rib type tread pattern are frequently induced. This forcedly degrades the durability of the tire to an inadmissible extent.

As a result, when the tire is used for the above mentioned purposes, it is indispensable to use a tire having a lug type tread pattern (hereinafter will be called as a lug tire). In the tire having the rib type tread pattern (hereinafter will be called as a rib tire), the tread continuously makes contact with ground when the tire rotates under load. On the contrary, in the lug tire, the lugs intermittently make contact with ground in succession so that noise produced when the tire runs under load becomes inevitably higher than that of the rib tire. The noise due to tires in road traffic is mainly caused by the lug tire.

Many attempts have been made to reduce the noise due to the lug tire, but hitherto none has led to fully satisfactory results due to degradation of durability and dynamic ability of the tire.

As one of such attempts, it has been proposed to make a crown radius of the tread of a tire having a size of 10,00-20, that is, a radius of curvature of an outer contour curve of the crown appeared on the radial cross sectional plane of the tire small to the order at most 250 mm. In this case, a decrease of the amount of tread rubber exerting adverse influence upon the resistance to wear of the tire functions together with a local increase of the ground contact pressure distribution at the crown center region to significantly shorten the wear life of the tire. In addition, a decrease of the ground contact area and improper ground contact configuration and improper ground contact pressure distribution result in deterioration of both the steering stability and the antiskid property of the tire, thereby exhibiting practically inadmissible drawbacks.

A mechanism of generating noise when the tire runs can be summarized as follows.

(1) When the tire makes contact with ground, the tread is deformed to compress air occluded in grooves and these cause the compressed air to expand, thereby producing a rare and dense wave, which will hereinafter be called as pumping noise.

(2) Indentations due to the presence of transverse grooves arranged on the tread cause the tread rubber to change in thickness and configuration at various circumferential portions of the tread, so that the tread and case oscillates due to synchronous shocks produced between the ground surface and the tire when it rotates, which will hereinafter be called impacting noise.

(3) Before and after the tire makes contact with ground, the tread is deformed to produce a partial slip.

The noise generated by the lug tire is mainly caused by (1) the pumping noise and (2) the impacting noise dependent on the configuration per se of the transverse groove and running speed of the tire. It has been found out that the influence of (1) the pumping noise and of (2) the impacting noise upon the noise of the lug tire are substantially the same with each other at a speed of at most 80 km/h. As a result, even though the cause of either one of (1) the pumping noise and (2) the impacting noise is eliminated, the real noise preventive effect is not sufficient enough and eventually causes the other noise to increase and hence the noise preventive effect as expected could not be obtained. As seen from the above, one of both the pumping noise (1) and the impacting noise (2) must be improved without deteriorating the other noise and without degrading the durability, steering stability and antiskid property of the tire.

Experimental tests have demonstrated the result that, in the above described kind of tire, if various dimensions for determining the plane configuration and cross-sectional plane (the cross-sectional plane in the circumferential or meridian direction of the tire, that is, the cross-sectional plane on a normal line drawn perpendicular to the outer contour curve of the tread) configuration of the transverse groove are made optimum, it is possible to overcome the conditions with respect to the low noise property, durability, steering stability and antiskid property which contradict each other.

SUMMARY OF THE INVENTION

An object of the invention, therefore, is to provide a low noise lug tire which can sufficiently reduce the noise at all range of the usual speed of the lug tire, that is, at a speed lower than 80 km/h without degrading the durability and dynamic property of the tire.

A feature of the invention is the provision in a low noise lug tire for vehicles run at a high speed under a heavy load comprising a number of lugs circumferentially arranged along the periphery of a tread and spaced apart from each other and a number of transverse grooves which are the same in number as said lugs and delimiting said lugs. Each of said transverse grooves is opened to one of two shoulders of the tire and arranged at the left and right sides of the equatorial line of the tire and forming a pair of transverse grooves. Each of said transverse grooves has a ratio Wg/Wl of equal to or smaller than 1.0 where Wg is a width of said transverse groove measured at a periphery passing a midpoint between the equatorial line of the tire and the shoulder of the tire and Wl is a width of said lug measured in the same manner as Wg. The side of left and right tread halves is divided by said equatorial line which is distant apart from the center of a road defined by the traffic regulation, each of said transverse grooves as a whole is not inclined toward said opening thereof at the kickout side of each lug, but inclined toward said opening thereof at the stepin side of each lug at an angle of at most 22°. This angle is formed between a segment for connecting two ends of a center line of said transverse groove passing midpoint of widths of said transverse groove measured along the periphery of said tread on the one hand and the meridian line of the tire on the other hand. Each portion of said center line of said transverse groove in a substantially total region of a length L of said transverse groove extending along the meridian line of the tire is inclined with respect to the meridian line of the tire at an angle defined as above and within a range from at most 15° measured in a direction opposite to said inclined direction of said transverse groove as a whole to at most 60° measured in the same direction as said inclined direction. Each portion of said center line of said transverse groove in a region extending at least 60% of said length L of said transverse groove is inclined with respect to the meridian line of the tire at an angle as defined above and within a range from at most 2° measured in a direction opposite to said inclined direction of said transverse groove as a whole to at most 30° measured in the same direction as said inclined direction, and in a region extending from the inner end of each of said transverse grooves to a position which is at least 75% of the length L of said transverse groove. The inclination of said transverse groove as a whole at the stepin side of each lug toward said opening of each of said transverse grooves is increased in response to the advance of tread wear.

Further objects and features of the invention will be fully understood from the following detailed description with reference to the accompanying drawings, wherein:

BRIEF EXPLANATION OF THE DRAWINGS

FIG. 1b is a development view of a tread of the tire shown in FIG. 1a;

FIG. 1c is a section on line I—I of FIGS. 1a and 1b;

FIG. 1d is a section on line II—II of FIGS. 1a and 1b;

FIG. 1e is a section on line III—III of FIGS. 1a and 1b;

FIG. 2 is a radial cross-sectional view of a square shoulder portion of a tire shown in FIG. 1a;

FIGS. 10a, 10b and 11a, 11b are explanatory views showing plane configurations of tread surface opening portions of transverse grooves and a relation between the ground contact configuration and the order in succession of the ground contact when the vehicles run the road while keeping to the left;

FIG. 18b is an explanatory perspective view showing the inclined condition of the transverse groove wall shown in FIG. 18a;

DETAILED DESCRIPTION OF PREFERRED EMBODIMENTS

Figure 1A:
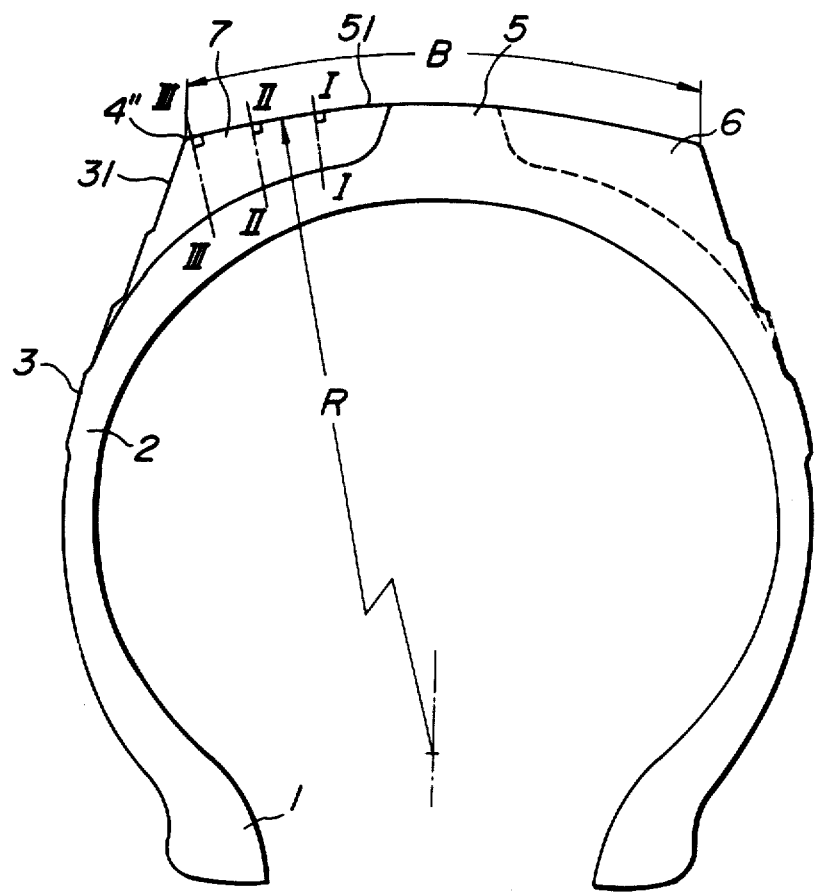
FIG. 1a is a radial cross-sectional view of one embodiment of a low noise lug tire according to the invention.
Figure 1F:
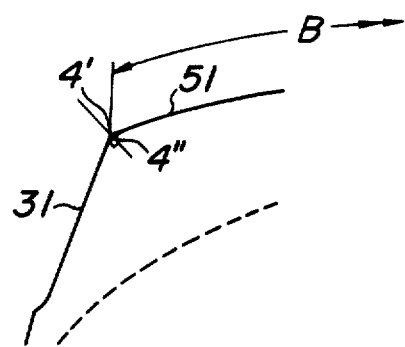
FIG. 1f is a section on line IV—IV of FIG. 1b.
Figure 2:
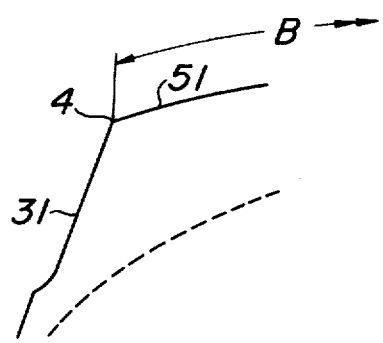

FIG. 1 shows one embodiment of a lug tire according to the invention wherein FIG. 1a is a radial cross-sectional view of the tire, FIG. 1b is a development view of a part of the tread, FIG. 1c is a section on line I—I of FIGS. 1a and 1b, FIG. 1d is a section on line II—II of FIGS. 1a and 1b, and FIG. 1e is a section on line III—III of FIGS. 1a and 1b, FIG. 1f is a section on line IV—IV of FIG. 1b and showing a round shoulder. FIG. 2 is a partial cross-sectional view of a square shoulder.

Referring to FIGS. 1 and 2, reference numeral 1 designates a bead portion, 2 a carcass, 3 a side portion, 4, 4" a shoulder, 5 a tread, 6 a lug and 7 a transverse groove.

In the present invention, the dimensions of various parts of the tire shall be understood to mean those of the tire which are taken when the tire is mounted on a rim and inflated by applying an internal pressure therein.

A tread width B along the crown surface shown in FIG. 1a is a distance between the two shoulders 4" measured along an outer contour curve 51 of the tread 5 at a radial section containing the rotating axis of the tire. In the case of the square type shoulder shown in FIG. 2, the shoulder 4 shall be understood to mean a point of intersection where the outer contour curve 51 and a sectional contour curve 31 of the side portion 3 are crossed with each other. In the case of a round type shoulder shown in FIG. 1f, the shoulder shall be understood to mean a point of intersection 4″ where a normal line drawn perpendicular to the tire surface from a point of intersection 4′ where extensions of two curves 51, 31 are crossed with each other on the one hand and the tire surface on the other hand are crossed with each other.

In the present invention, in the first place, in a half tread region obtained by dividing the tread by the equatorial line 52 of the tire, it is required that the transverse groove 7 as a whole is not inclined at a kickout side 6b of each lug 6 toward the opening of the transverse groove 7 at that side of the road which is distant apart from at least the center of the road defined according to the traffic regulation. The use of such measures ensures an easy release of air occuluded in the transverse groove 7 everytime it arrives at the ground contact area due to the deformation of the lug and provides the important advantage that the tread makes contact with ground at a later time.

The inclination of the transverse groove 7 toward the opening thereof at the stepin side 6a is defined such that the transverse groove 7 is forwardly inclined, while the inclination of the transverse groove 7 toward the opposite side of the meridian line of the tire, that is, toward the kickout side 6b is defined such that the transverse groove 7 is oppositely inclined.

Figure 3A:
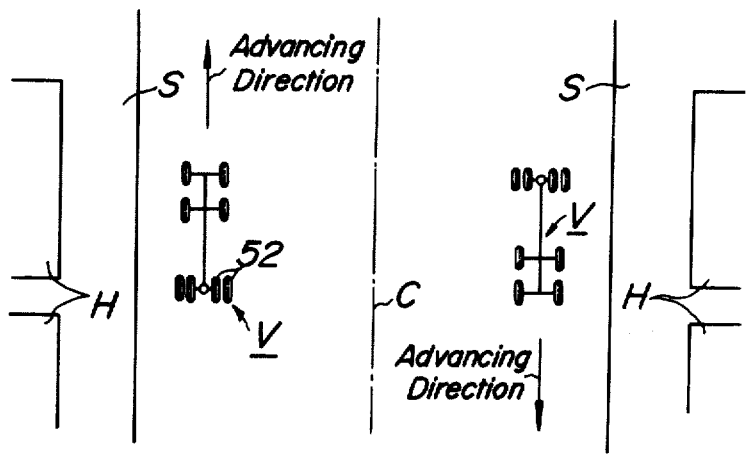
FIG. 3a is a top view showing a road, moving direction of vehicles and a relation between tires and houses when vehicles run the road while keeping to the left.
Figure 4:
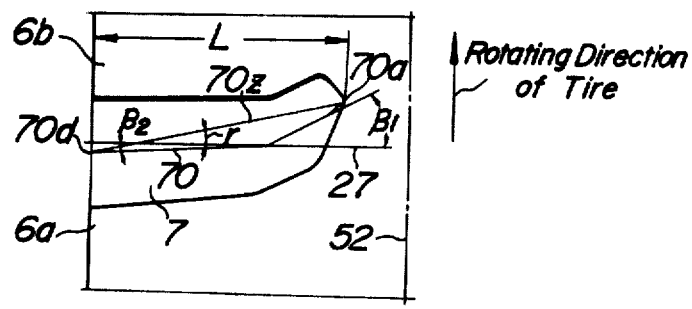
FIGS. 4, 5 and 6 are development views of a tread for one pitch of the left side half of a lug tire according to the invention viewed from the rotating direction of the tire with respect to the equatorial line of the tire when the vehicle runs the road while keeping to the left.
Figure 5:
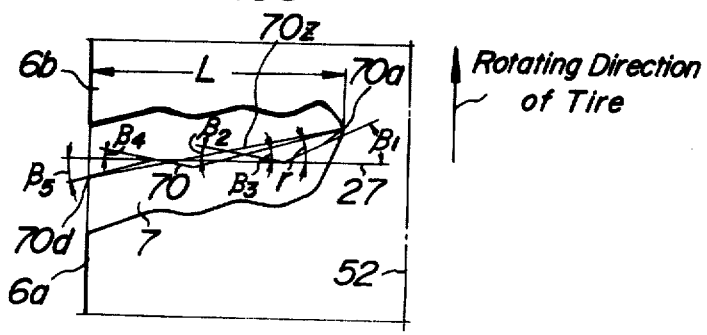
Figure 6:
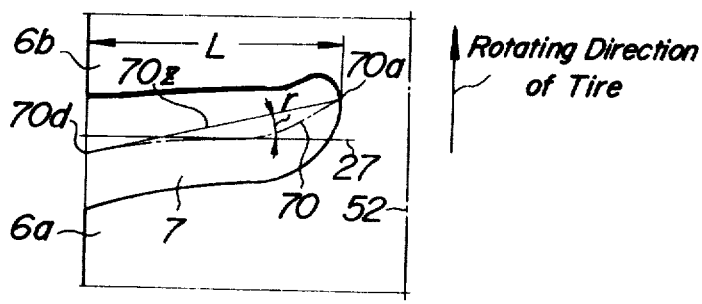

In the case of traffic regulations according to which vehicles run while keeping to the left in Japan and Britain, for example, as shown in FIG. 3a, at least in the left side half region of the tire with respect to the equatorial line 52 (inclined hatched region), a polygonal line-shaped or wave-shaped center line 70 of the transverse groove 7 formed by connecting the midpoints of the opening width along the periphery of the tread is inclined at angles $\beta_1$, $\beta_2$ (FIG. 4) and at angles $\beta_3$, $\beta_4$ and $\beta_5$ (FIG. 5) with respect to the meridian line 27 (hereinafter will be represented by $\beta$). It is made different in direction along substantially total region of the length L of the transverse groove 7. As shown in FIGS. 4 to 6, the center line is at an angle within a range from at most 15°, preferably at most 8° in the opposite direction, that is, in the rightwards rotating direction viewed in the drawing to at most 60°, preferably at most 45° in the forward direction, that is, in the leftwards rotating direction viewed in the drawing. In addition, along a range from at least 60%, preferably at least 75% of the length L of the transverse groove, the angle $\beta$ is made at most 2°, preferably at most 1° in the rightwards rotating direction viewed in the drawing to at most 30° in the leftwards rotating direction viewed in the drawing. Moreover, a segment 70Z for connecting the inner end of a center line 70 of the transverse groove 7, that is, an end 70a nearest to the center of the tread to the outer end of the center line 70 of the transverse groove 7, that is, a shoulder end 70d is inclined at an angle $\gamma$ of at most 22°, preferably at most 16° in the leftwards rotating direction with respect to the meridian line 27 of the tire.

Figure 3B:
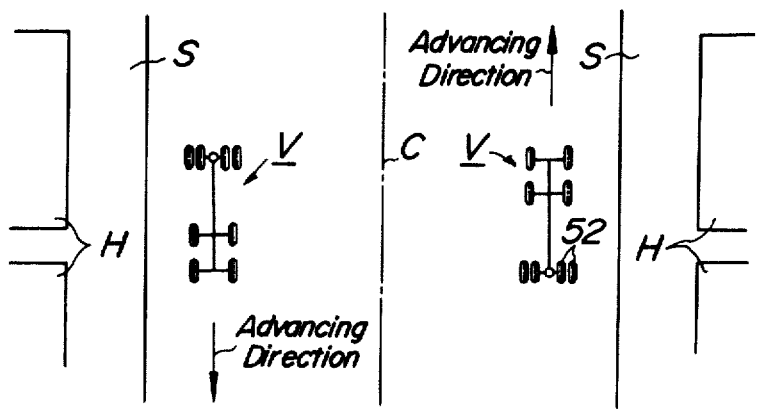
FIG. 3b is a similar top view to FIG. 3a when vehicles run the road while keeping to the right.
Figure 7:
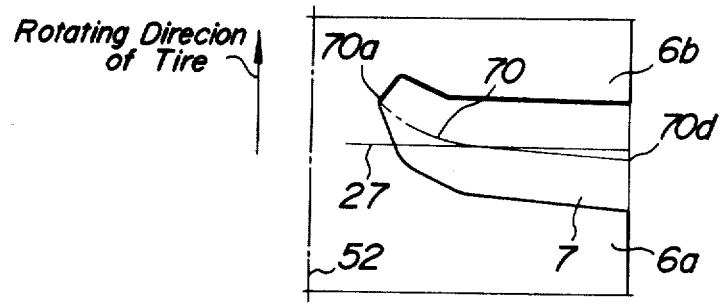
FIGS. 7, 8 and 9 are development views of a tread for one pitch of the right side half of a lug tire according to the invention viewed from the rotating direction of the tire with respect to the equatorial line of the tire when the vehicle runs the road while keeping to the right.
Figure 8:
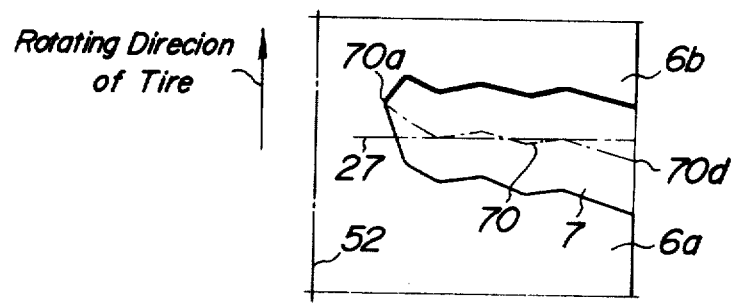
Figure 9:
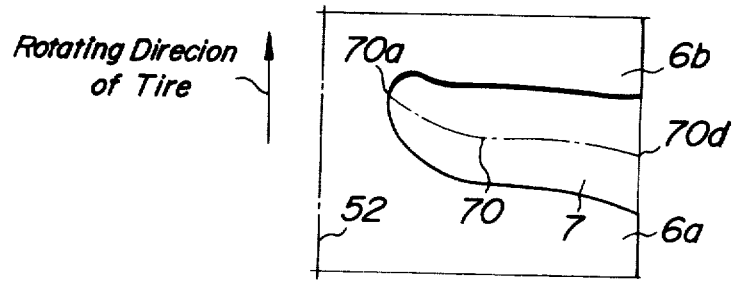

In the case of traffic regulations according to which vehicles run while keeping to the right in U.S.A., for example, as shown in FIG. 3b, at least in the right side half region of the tire with respect to the equatorial line 52 (shown by inclined hatched region) in the running direction of the vehicle, a polygonal line-shaped or wave-shaped center line 70 of the transverse groove 7 is made symmetrical to that shown in FIGS. 4 to 6 with respect to the equatorial line 52 of the tire as shown in FIGS. 7 to 9.

In FIGS. 3a and 3b, reference letter C designates a center line of the driveway, V a vehicle, S a sidewalk and H a house.

Sound energy passing through a unit area for a unit time is inversely proportional to square of a distance from a sound source to the unit area. As a result, when the vehicle runs while keeping to the left, noise incident on the house H located at the left side with respect to the running direction of the vehicle V is higher in level than noise incident on the house located at the right side. As a result, the influence of the noise exerted to the house H from the left half region of the tread halves divided by the equatorial line 52 of the tire is larger than that of the noise exerted to the house H from the right half region of the tread halves. Thus, it is necessary to restrain or reduce the noise produced from the left half region of the tread halves. For this purpose, the above mentioned configuration and arrangement must be given to the transverse groove 7. That is, at least in the tread half region of the tire distant apart from the center C of the driveway V, the transverse groove 7 as a whole is not inclined at the kickout side 6b of the lug 6 toward the opening of the shoulder.

Figure 10A:
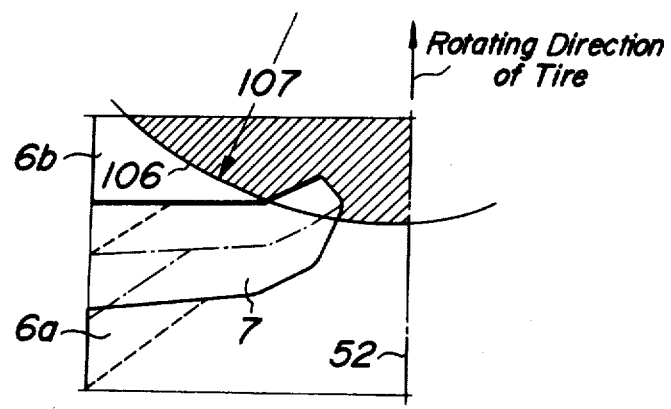
Figure 10B:
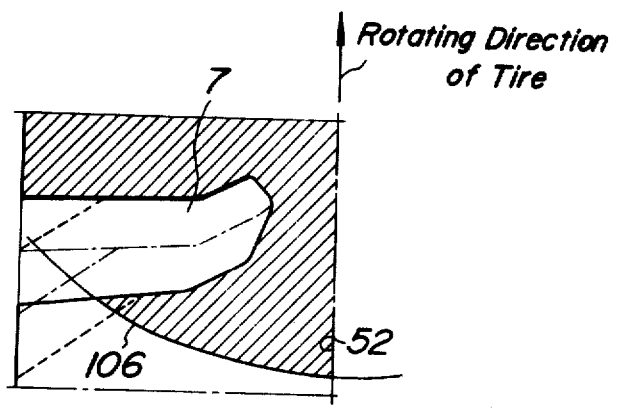

This relation will now be explained with reference to an embodiment shown in FIGS. 10a and 10b. FIGS. 10a and 10b show that order of the left side tread half region in the rotating direction of the tire with respect to the equatorial line 52 of the tire which makes contact with ground viewed from the tire surface. The tire makes contact with the ground in the order as shown in FIG. 10a and FIG. 10b. In FIGS. 10a and 10b, reference numeral 106 designates an outer contour of the ground contact surface of the tire. In the usual case, this outer contour 106 always traces an arc in the direction shown in FIGS. 10a and 10b. This arc has a radius of curvature 107 which becomes small as a crown radius R is decreased. As a result, in order to reduce the noise produced from the left side tread half region with respect to the rotating direction of the tire, it is preferable to cause the center line 70 of the transverse groove 7 as a whole to extend substantially in parallel with the meridian line 27 or to incline downwardly from the inner end 70a toward the outer end 70d. Because, the use of such measure ensues an increase of time lag of the transverse groove 7 when the ground contact portion of the transverse groove 7 makes advancement from the region near the center to the region near the shoulder in succession, so that overall shock energy of the tire can be reduced. In addition, air occluded in the transverse groove 7 easily flows out of it so that overall compressive energy of air can be reduced. Meanwhile, if the above mentioned downward inclination of the center line 70 of the transverse groove 7 as a whole exceeds the upper limit thereof as shown by dotted lines in FIGS. 10 and 11, for example, the noise emitted from the tread half region located at the left side of the tire rotating direction (FIG. 10) is reduced, but the noise emitted from the tread half region located at the right side of the tire rotating direction (FIG. 11) becomes excessively large. As a result, sound diffraction phenomenon causes the noise reaching to the house H located at the left side with respect to the running direction of the vehicle V to increase. These are the reasons why the respective numerical values are determined within the above described ranges.

The reasons why the noise emitted from the tread half region located at the right side of the tire rotating direction becomes excessively large when the leftwardly downward inclination of the center line of the transverse groove exceeds the upper limit thereof will now be described.

It has been the common practice to interchange the mounting position of the tire for the purpose of reducing the uneven wear of the tire and hence of increasing the wear resistant life of the tire. In the case of rotating the tire in the opposite direction after the mounting position of the tire has been interchanged, the left side tread half region with respect to the previous rotating direction of the tire is changed into the right side tread half region with respect to the rotating direction of the tire after the mounting position of the tire has been interchanged. As a result, the interchange of the tire causes the condition shown in FIG. 10 to change into the condition shown in FIG. 11 which is entirely opposite to the condition shown in FIG. 10. That is, even though the condition shown in FIG. 10 is of satisfactory one, if the leftwardly downward inclination exceeds the upper limit thereof, the bad influence exerted by the condition shown in FIG. 11 becomes excessively large and the noise reaching to the house H located at the left side with respect to the running direction of the vehicle V is increased.

In the case of traffic regulations according to which vehicles run while keeping to the right, the above mentioned measure will be opposite to that described above with respect to the equatorial line 52 of the tire.

In addition, it is important to satisfy the following conditions. That is, an inclined angle $\theta$ of the groove wall is defined by an angle formed between a segment 71 connecting a crossing point X where the outer contour curve 53 of the tread 5 in the radial cross-sectional plane of the transverse groove 7 or its extension line crosses with the groove wall 71 or its extension line to a crossing point Y where an extension line of the transverse wall crosses a groove base on the one hand and a normal line 74 drawn from the crossing point X on the outer contour curve 53 of the tread 5 on the other hand. The inclined angle $\theta$ of the groove wall thus defined is determined such that the inclination as a whole of each said transverse groove 7 toward the stepin side thereof and toward the opening of each transverse groove 7 at that region of the transverse groove length L which covers at least 75% from the inner end 70a is increased in response to the growth of the tread wear. As a result, air occluded in the transverse groove 7 can easily be released from the opening of the transverse groove 7 due to the deformation of the lug 6 everytime the transverse groove 7 arrives at the ground contact region during rotation of the tire and the lug can make contact with ground at a later time.

It is a matter of course that the tire must maintain its low noise property for a period from a new tire to a completely worn tire. These are the reasons why the use of The above mentioned measure is essential.

Figure 12A:
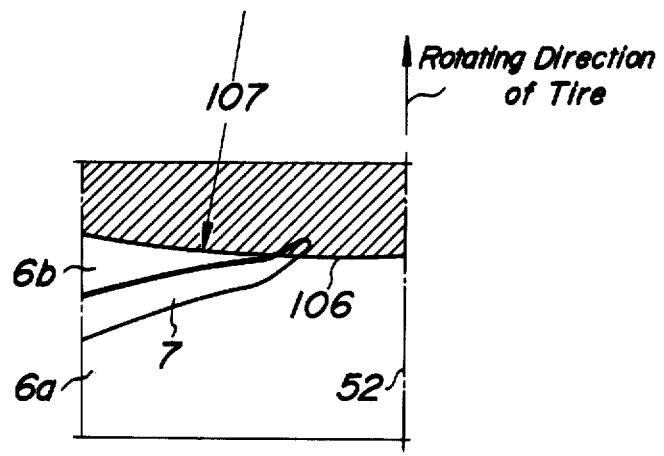
FIGS. 12a and 12b are explanatory views showing plane configuration of tread surface opening portions after the tread wear of the transverse groove has been advanced and a relation between the ground contact configuration and the order in succession of the ground contact when the vehicles run the road while keeping to the left.
Figure 12B:
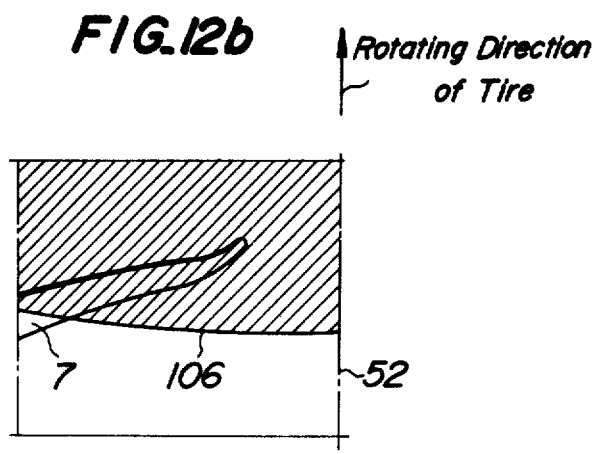

The above mentioned relation will now be described with reference to the practical example shown in FIGS. 10a and 10b. FIGS. 12a and 12b show the transverse groove 7 shown in FIGS. 10a and 10b after the tread has been worn. As clearly shown in FIGS. 10a and 12a, the radius of curvature 107 of the outer contour 106 is associated with the crown radius R such that the radius of curvature 107 becomes large in response to an increase of the crown radius R as the growth of the tread wear is accelerated. As a result, in order to reduce the noise emitted from the tread half region located at the left with respect to the rotating direction of not only a new tire but also of an old tire whose tread has been worn, it is preferable to increase the inclination in the leftward rotating direction of the center line 70 of the transverse groove 7 as a whole extending from the inner end 70a to the outer end 70d in response to the growth of the tread wear. Because, the use of such measure ensures, even after the growth of the tread wear, an increase of time lag that the transverse groove 7 makes contact with ground from its region near the center of the transverse groove 7 to the region near the shoulder in succession when the tire runs under load, so that the overall shock energy per unit time is reduced and because the overall compressive energy of air per unit area becomes small since the air occluded in the transverse groove 7 can easily be released therefrom.

One example of such effect of a lug tire having a size of 10.00-20 will be described with reference to FIGS. 13a, 13b and 13c.

Figure 13A:
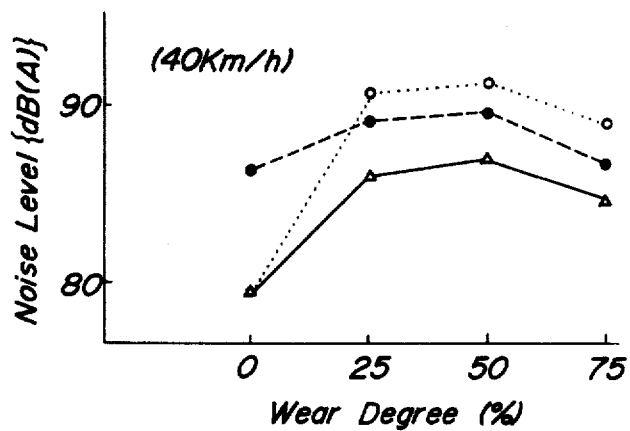
FIGS. 13a, 13b and 13c are graphs showing a relation between the degree of wear of the tire and the noise level of the tire.
Figure 13B:
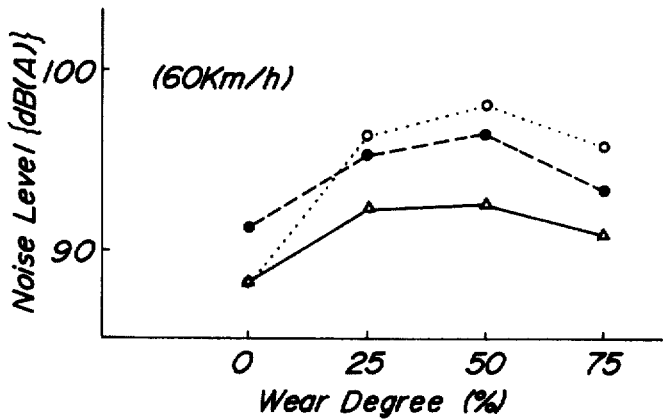
Figure 13C:
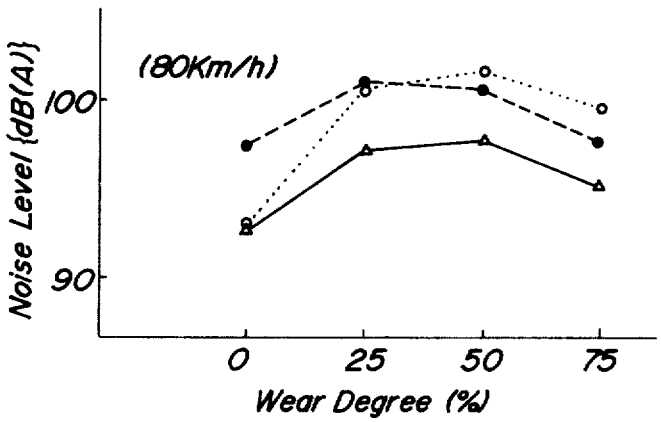

FIGS. 13a, 13b and 13c show graphs illustrating relations between the wear degree and the noise level of the lug tire subjected to the indoor drum test when the tire runs on the drum at speeds of 40 km/h, 60 km/h and 80 km/h, respectively.

In FIGS. 13a, 13b and 13c, the experimental test result is shown by broken lines for a comparative lug tire 1, by dotted lines for a comparative lug tire 2 and by a full line for a lug tire according to the invention.

The comparative lug tire 1 is a conventional lug tire in which the transverse groove is inclined at an angle which is increased toward the opening thereof at the stepin side of each lug and in which the sectional configuration of the transverse groove is substantially symmetrical with respect to the center line thereof, the transverse groove as a whole being not tortuous.

The comparative lug tire 2 is a tire in which the transverse groove as a whole is not so tortuous as in the lug tire according to the invention. As a result, each lug is inclined at an angle at the stepin side thereof which is not increased toward the opening of the transverse groove in response to the growth of the wear.

In FIGS. 13a, 13b and 13c, the ordinate shows noise level {dB(A)}, while abscissa shows real wear degree of the tread given by $$\frac{\left(\begin{array}{c}\text{Transverse groove}\\\text{depth of new tire}\end{array}\right) - \left(\begin{array}{c}\text{Remained transverse}\\\text{groove depth}\end{array}\right)}{\text{Transverse groove depth of new tire}} \times 100\%$$

In the above comparative tests, all of elements to be designed other than the transverse groove configuration are made constant.

The noise level was measured by a method defined by JIS Z8731 and using an indicating noise meter of JIS C1502. The noise level is a sensuous amount which represents one'degree of sensitivity when he hears sound in response to this hearing ability.

That is, if the noise level rises up to 10 dB (A), for example, one's ears can hear the noise which is twice times stronger than that of the previous noise level.

In the case of comparing the noise level with the sound intensity as the physical amount, that is, with the energy of sound passing through a unit area perpendicular to the direction of propagation of sound for a unit time, if the noise level rises up from the existing noise level by 3 dB (A), the sound energy becomes about two times larger than the previous noise level.

As a result, if the noise level becomes lower than the existing level by 3 dB (A), one's ears can hear the noise which is lower than the previous noise by the order of 20% and the sound energy becomes lower than the previous sound energy by 50%, that is, the sound energy becomes about half the previous sound energy.

Figure 3C:
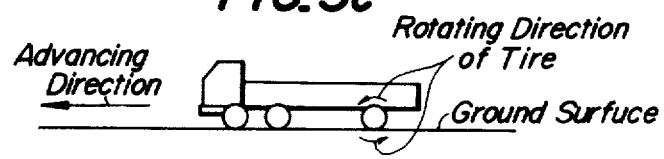
FIG. 3c is a side view showing a relation between the moving direction of a vehicle and the rotating direction of its tire.

Such effect is clearly shown in FIGS. 3a, 3b and 3c.

Preferred embodiments of the invention will now be described.

In the first place, in order to further reduce the noise after growth of the tread wear has been advanced, it is preferable that the above mentioned transverse groove wall angle $\theta a$ in the radial cross-sectional plane of near midpoint between the equatorial line 52 and the shoulder 4 or 4'' at the stepin side of the tire is made at least 8°, preferably, at least 12° larger than the angle $\theta b$ at the kickout side thereof. In addition, it is preferable that the above mentioned transverse groove wall angle $\theta b$ near the shoulder and at the kickout side is made larger at least 4° than the angle $\theta a$ at the stepin side of the lug.

The use of such measures ensures a further increase of the inclination as a whole at the stepin side of the lug 6 along the center line 70 of the transverse groove 7 from its inner end 70a to the outer end 70d thereof in response to the advanced growth of the tread wear.

Figure 14:
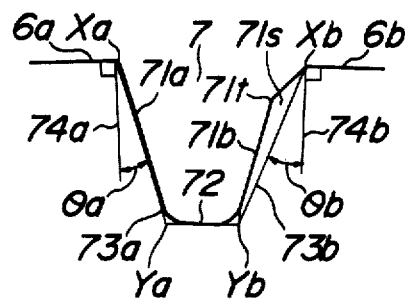
FIG. 14 is a circumferential cross-sectional view of another embodiment of a transverse groove of a lug tire according to the invention showing portions near the shoulder thereof.

Similarly, in order to further reduce the noise after the tread wear has been advanced, it is preferable that the groove wall at the kickout side of the transverse groove 7 and near the shoulder is made convex toward the groove base as shown in FIG. 14. Because, as the tread wear advances, the crown radius R is considerably large at the beginning of the tread wear, but decreases as the tread wear progresses and approaches the end of the tread wear. As a result, it is preferable that the inclination as a whole at the stepin side of the lug 6 along the center line 70 of the transverse groove 7 from its inner end 70a to the outer end 70d thereof tends to increase in response to the growth of the tread wear and that such tendency of increasing the inclination is made large at the beginning of the tread wear. Such a condition can be satisfied by the above mentioned measure.

As shown in FIG. 14, a convex-shaped projection 71s of the transverse groove 7 formed in correspondence with the increase of the crown radius R in the beginning of the wear is preferably constructed such that its top point 71t is vertically spaced apart from the tread surface by a distance which is 20 to 30% of a depth of the transverse groove measured from the tread surface. This is because of the fact that the crown radius R is significantly increased between the tread surface and the above defined surface and becomes slowly increased at a region exceeding the above defined surface.

Figure 18A:
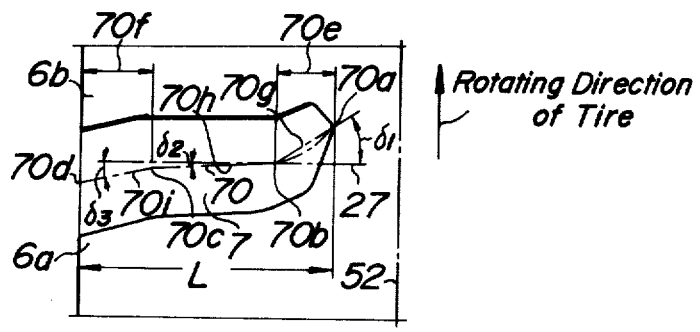
Figure 18B:
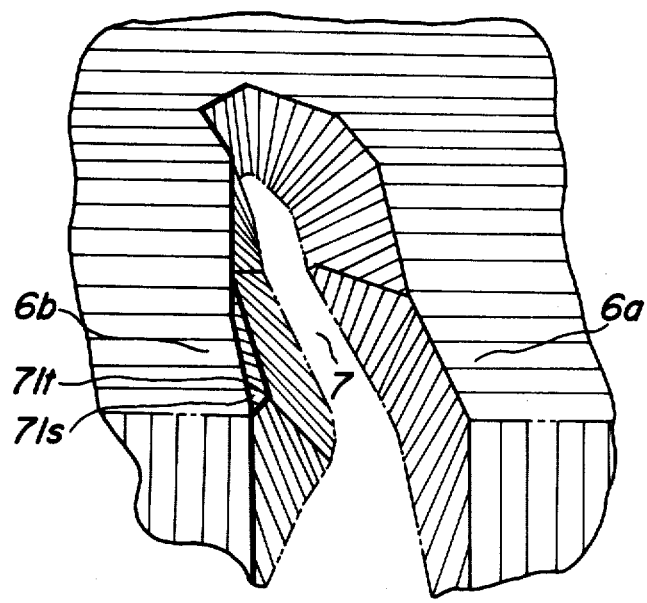

FIG. 18b shows the inclined condition of the groove wall of the transverse groove 7 of the embodiment shown in FIG. 18a.

As shown in FIG. 18b, a convex-shaped projection 71s is formed in the transverse groove wall at the kickout side of the lug and the difference between the groove angle at the kickout side of the lug and the groove angle at the stepin side thereof is made about 6°.

The groove angle at the stepin side of the lug is made smaller than the groove angle at the kickout side thereof to make the stepin side small in rigidity, thereby suppressing the generation of noise. This is due to the fact that one of causes of generating the noise is due to oscillations produced when the stepin side of the lug, particularly the stepin side at the shoulder portion of the lug makes contact with ground when the tire is rotated. As a result, it is preferable to make the rigidity of the stepin side of the lug low. The shock subjected to a portion near the center portion of the tread when the stepin side makes contact with ground is relatively small due to the presence of the circumferentially continuous rib.

As a result, in the present embodiment shown in FIG. 18, the rigidity of the groove wall near the center of the tread and located at the stepin side of the lug is not made small, but it does not exert very bad influence upon the noise.

In addition, in order to further reduce the noise without deteriorating the excellent durability and dynamic ability of the tire, the following conditions must be satisfied. That is, it is preferable that an indexing pitch (hereinafter will be called as a pitch) P defined on the equatorial line 52 of the tire on the basis of a crown peripheral width B is made (0.37 to 0.46) B, preferably (0.39 to 0.44) B. Moreover, it is preferable that the length L of the transverse groove 7 along the meridian line 27 of the tire is made (0.36 to 0.41) B, preferably (0.38 to 0.40) B. Furthermore it is also preferable that a ratio of a groove width Wg of a transverse groove 7 measured along a midline between the equatorial line 52 and the shoulder 4 or 4'' to a width Wl of a corresponding lug 6 is made 0.5 to 0.71, preferably 0.53 to 0.67. The lower limit of the above mentioned pitch P, the upper limit of the above mentioned transverse groove length L and the upper limit of the above mentioned ratio Wg/Wl are defined from the aspect of reducing the noise. The upper limit of the pitch P, the lower limit of the transverse groove length L and the lower and upper limits of the ratio Wg/Wl are defined from the aspect of maintaining the durability and dynamic ability of the tire.

In order to further reduce the noise, it is preferable, in the case of forming a given pitch P by a combination of each lug 6 and corresponding adjacent transverse groove 7, that a pitch Pa formed by a combination of a lug 6a and corresponding transverse groove 7a is equal to a pitch Pb formed by a combination of another lug 6b and corresponding transverse groove 7b, but is different from a pitch Pc formed by a combination of a further lug 6c and corresponding transverse groove 7c. It is also preferable that the above mentioned different kinds of pitches are circumferentially arranged such that the peak oscillation frequency thereof does not coincide recurrently with the resonance frequency of the tire, thereby forming a so-called variable pitch.

All tires have their inherent resonance frequencies. Some of these resonance frequencies can be formed by rotating the tire at continuously changeable speeds and by continuously measuring the noise level produced from the tire. That is, if tires to be tested are rotated and the rotating speed thereof is made sufficiently high and then the tires coast to gradually reduce the rotating speed thereof, the noise level is not simply reduced in response to the decrease of the speed, but suddenly increased to a peak value. Such peak of the noise level is usually found at five to seven points within a normal speed range of 30 km/h to 80 km/h. The resonance of the tire occurs at that speed at which the noise level shows a peak level. The resonance frequency of the tire can be found by analyzing the frequency of the sound at the peak point thereof.

The noise level reaches a peak when the peak oscillation frequency produced at the tread pattern portion by the rotation of the tire is repeatedly brought into agreement with the resonance frequency of the tire. The noise level becomes inevitably peaked when the pitch P defined on the equatorial line 52 is of so-called monopitch in which a combination of each lug 6 and corresponding adjacent transverse groove 7 forms a given pitch P and all the lengths of these given pitches P, P . . . are substantially the same along the periphery of the tire.

In the case of a variable pitch in which several kinds of pitches having different lengths are circumferentially arranged such that the peak oscillation frequency thereof does not repeatedly coincide with the resonance frequency of the tire, the number of times that the peak oscillation frequency produced on the tread pattern portion due to the rotation of the tire coincides repeatedly with the resonance frequency of the tire becomes considerably decreased, thereby significantly reducing the resonance of the tire. As a result, the noise level shows a little or substantially no peak, thereby reducing the noise level. The peak oscillation frequency of the variable pitch is dispersed in separate positions if compared with that of the monopitch so that the noise is changed into a sound which is very easy to hear.

In the case of effectively reducing the noise of the tire without deteriorating its excellent durability and dynamic ability, use may be made of a variable pitch composed of two different kinds of pitches having a pitch ratio within a range of 9.5($\pm$0.25):10.5($\pm$0.25). If the value of this ratio exceeds its upper limit, the effect of reducing the noise becomes suddenly decreased, while if the value of the ratio is smaller than its lower limit, the durability as well as the steering stability and antiskid property becomes inferior to those allowable in practice. As a result, the upper and lower limits of the pitch are defined to the above mentioned numerical values.

In addition, in order to effectively reduce the noise without deteriorating the high durability and dynamic ability, use may be made of a variable pitch composed of three different kinds of pitches having a pitch ratio of 9($\pm$0.25):10($\pm$0.25):11($\pm$0.25). The reasons why the upper and lower limits are defined to the above mentioned numerical values are the same as those of the variable pitch composed of two different kinds of pitches.

In the variable pitch, the pitch P along the equatorial line 52 shall be understood to mean a numerical value obtained by dividing the outer periphery of the tire by the total number of pitches. In addition, the circumferential lug width W1 for defining the ratio Wg/W1 shall be understood to mean an average value of the circumferential lug widths located at the both sides of the transverse groove 7.

Figure 15:
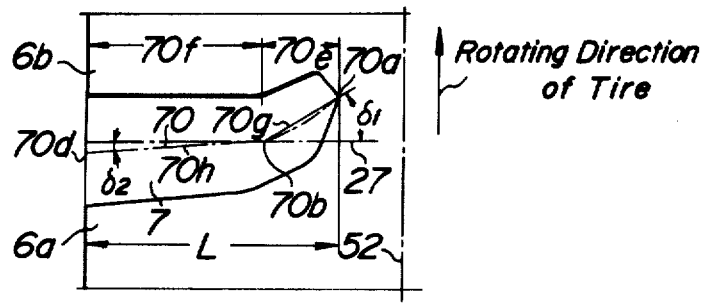
FIGS. 15, 16, 17a, 17b and 18a are development views of a tread for one pitch thereof, respectively.
Figure 16:
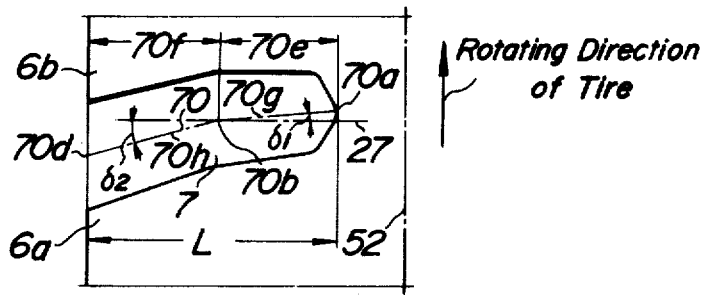

Moreover, as shown in FIGS. 15 and 16, in order to further improve the antiskid property of the tire, it is preferable that the center line 70 of the transverse groove 7 is bent to form a bent center line composed of substantially two segments.

This is because of the fact that when a vehicle turns, the total sum of lengths of projections, formed on the equatorial line 52, of the groove edge of the transverse groove 7 and the shoulder edge of the lug 6 located in the ground contact area and exhibiting the antiskid property is increased, particularly that part of the length of projection which is formed on the equatorial line 52 and located near the shoulder edge of the lug 6 subjected to the centrifugal force and exhibiting the antiskid property is increased as compared with the above mentioned total sum of lengths of projections.

In this case, in order not only to improve the antiskid property but also to reduce noise, in the case of the traffic regulation according to which vehicles run while keeping to the left, it is preferable that a length 70e along the meridian line 27 from the inner end 70a of the center line 70 of the transverse groove 7 to an inflectional point 70b is equal to (0.19 to 0.41) times, preferably (0.23 to 0.37) times the length L of the transverse groove 7. In addition, it is preferable that a segment 70g for connecting the inner end 70a of the center line 70 of the transverse groove 7 to the inflectional point 70b is inclined at an angle $\delta_1$ of 20° to 40°, preferably 25° to 35° with respect to the meridian line 27 of the tire. Moreover, it is preferable that a segment 70h for connecting the inflectional point 70b to the outer end 70d of the center line 70 of the transverse groove 7 is substantially in parallel with the meridian line 27 of the tire or is inclined at an angle of $\delta_2$ of at most 10°, preferably at most 7° with respect to the meridian line 27 of the fire.

Alternatively, as shown in FIG. 16, a distance 70f from the inflectional point 70b of the center line 70 of the transverse groove 7 to the outer end 70d thereof may be made equal to (0.40 to 0.68) times, preferable (0.46 to 0.62) times the length L of the transverse groove 7. In addition, a segment 70h for connecting the inflectional point 70b to the outer end 70d may be inclined at an angle $\delta_2$ of 10° to 25°, preferably 12° to 20° with respect to the meridian line 27 of the tire. Moreover, the segment 70g for connecting the inner end 7a to the inflectional point 70b may be made substantially parallel with the meridian line 27 of the tire or may be inclined at an angle $\delta_1$ of at most 8°, preferably at most 5° with respect to the meridian line 27 of the tire.

In the case of traffic regulations according to which vehicles run while keeping to the right as shown in FIG. 3b, in that tread half region with respect to the equatorial line 52 which is opposite to the above mentioned tread half region shown in FIG. 3a, the arrangement and configuration of the transverse groove are made symmetrical with respect to the equatorial line 52 of the tire.

In the embodiment shown in FIG. 15, if the distance 70e along the meridian line 27 from the inner end 70a of the center line 70 of the transverse groove 7 to the inflectional point 70b, the angle $\delta_1$ of the segment 70g for connecting the inner end 70a to the inflectional point 70b and inclined with respect to the meridian line 27 and the angle $\delta_2$ of the segment 70h for connecting the flectional point 70b of the center line 70 of the transverse groove 7 to the outer end 70d and inclined with respect to the meridian line 27 become smaller than the lower limits thereof, both the effect of improving the antiskid property and the effect of reducing the noise are suddenly decreased so that the above mentioned respective lower limit values are defined. On the contrary, if the above mentioned distance 70e, angle $\delta_1$ and $\delta_2$ exceed the upper limits thereof, the effect of improving the antiskid property only is improved, but the uneven wear resistant property becomes inferior to that allowables in practice. In addition, the noise emitted from that portion of the tire which is located at the left thereof with respect to the forward running direction of the tire is decreased, but the noise emitted from that portion of the tire which is located at the right thereof with respect to the forward running direction of the tire becomes excessively large. As a result, the sound diffraction phenomenon causes the noise reaching to those houses which are located at the left side with respect to the forward running direction of the vehicle to increase. Thus, the above mentioned respective upper limit values are defined.

In the embodiment shown in FIG. 16, the reasons why the upper and lower limits of the distance 70f along the meridian line 27 from the inflectional point 70b to the outer end 70d, the angle $\delta_2$ of the segment 70h for connecting the inflectional point 70b to the outer end 70d and inclined with respect to the meridian line 27 and the angle $\delta_1$ of the segment 70g for connecting the inner end 70a of the center line 70 of the transverse groove 7 to the inflectional point 70b and inclined with respect to the meridian line 27 are defined to the above mentioned numerical values are the same as those described with reference to the embodiment shown in FIG. 15.

Figure 17A:
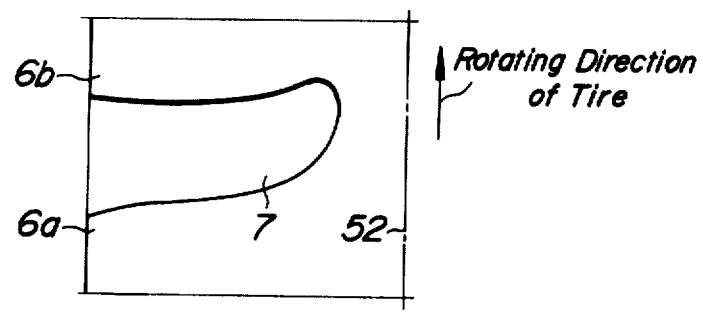
Figure 17B:
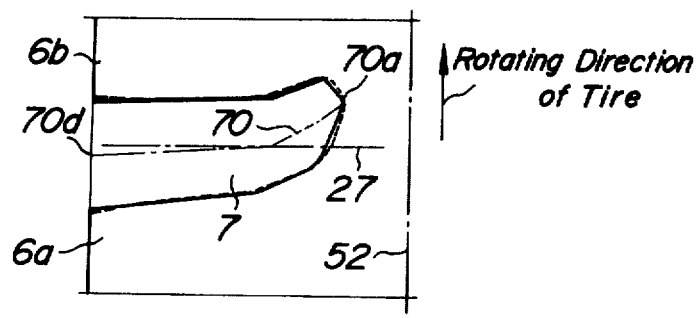

The above mentioned embodiment comprising a transverse groove having a bent center line composed of two segments may also cover an embodiment shown in FIG. 17a. This is because of the fact that the difference between the embodiment shown in FIG. 15 and also shown by a full line in FIG. 17b and the embodiment shown in FIG. 17a and also shown by dotted lines in FIG. 17b is extremely small and that the function and effect of the former are the same as those of the latter.

Furthermore, in order to still further improve the antiskid property of the tire, it is preferable that the center line 70 of the transverse groove 7 be bent to form a bent center line composed of three segments as shown in FIG. 18a.

In the embodiment shown in FIG. 18a, if vehicles run according to the traffic regulation according to which vehicles run while keeping to the left as shown in FIG. 3a, in the left side hatched region with respect to the equatorial line 52 of the tire, it is preferable, as shown in FIG. 18a, that a distance 70e from the inner end 70a of the groove center line 70 to a first inflectional point 70b is equal to (0.15 to 0.33) times, preferably (0.19 to 0.29) times the groove length L, that a distance 70f from a second inflectional point 70c of the groove center line 70 to the outer end 7d thereof is equal to (0.25 to 0.49) times, preferably (0.30 to 0.45) times the groove length L, that a segment 70g for connecting the inner end 70a to the first inflectional point 70b is inclined at an angle $\delta_1$ of 20° to 40°, preferably 25° to 35° with respect to the meridian line 27, that a segment 70h for connecting the first inflectional point 70b to a second inflectional point 70c extends substantially in parallel with the meridian line 27 or is inclined at an angle $\delta_2$ of at most 7°, preferably at most 4° with respect to the meridian line 27 and that a segment 70i for connecting the second inflectional point 70c to the outer end 70d is inclined at an angle $\delta_3$ of 6° to 18°, preferably 8° to 15° with respect to the meridian line 27 of the tire.

If vehicles run according to traffic regulations of keeping the vehicles to the right as shown in FIG. 3b, the above mentioned measures are applied to the tread half region of the tire located at the right side of the equatorial line 52 of the tire. The reasons why the upper and lower limits are defined to the above mentioned numerical values are the same as those described with reference to the embodiment comprising a transverse groove having a bent center line composed of two segments.

Figure 19A:
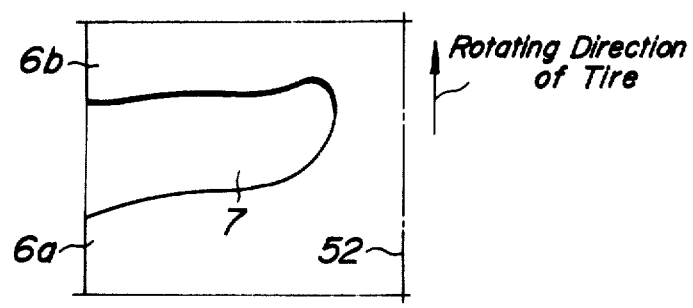
FIGS. 19a and 19b are development views of the tread for one pitch of a lug tire according to the invention, respectively.
Figure 19B:
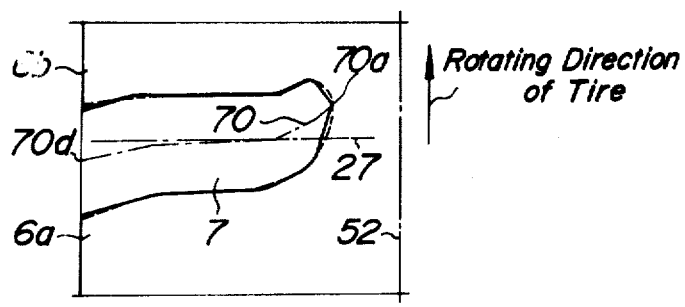

The above mentioned embodiment comprising a transverse groove having a bent center line composed of three segments may also cover an embodiment shown in FIG. 19a. This is because of the fact that the difference between the embodiment shown in FIG. 18a and also shown by a full line in FIG. 19b and the embodiment shown in FIG. 19a and also shown by dotted lines in FIG. 19b is extremely small and hence the function and effect of the former are the same as those of the latter.

In order to reduce the uneven wear and significantly improve both the wear resistant property and the durability, it is preferable that the transverse grooves 7 located at the left side of the equatorial line 52 of the tire are arranged substantially alternately with the transverse grooves 7 located at the right side thereof as shown in FIGS. 1b, 20, 21, 22 and 23. The use of such measure ensures an elimination of the uneven wear.

Figure 20:
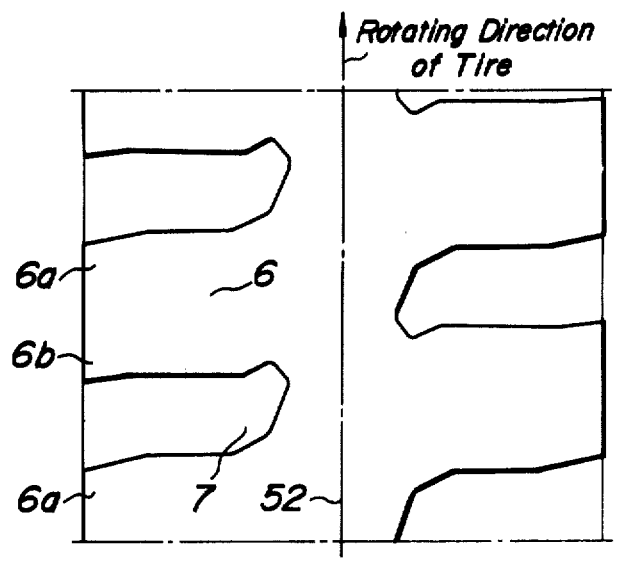
FIGS. 20, 21, 22 and 23 are development views of a lug tire according to the invention, respectively.
Figure 21:
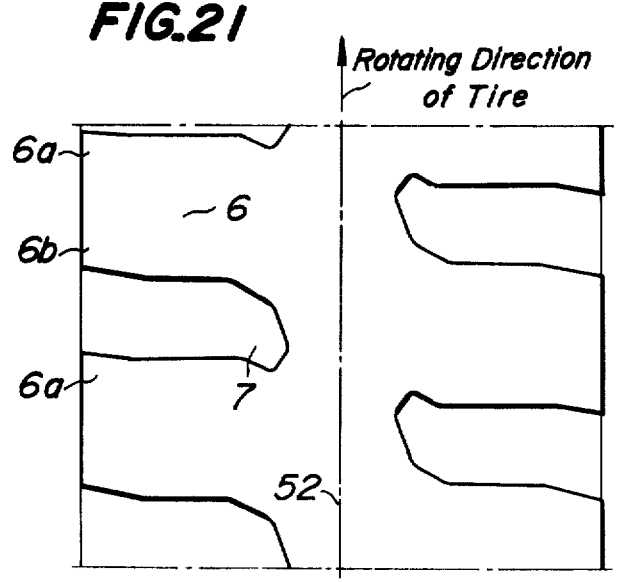

In addition, in order to significantly reduce the noise and significantly alleviate the uneven wear of the tire, if vehicles run according to traffic regulations of keeping the running vehicles to the left, it is preferable to arrange the transverse grooves 7 at the left and right sides of the equatorial line 52 of the tire such that these transverse grooves 7 are point symmetrical with respect to a point on the equatorial line 52 of the tire as shown in FIG. 20. If vehicles run according to traffic regulations of keeping the running vehicles to the right, it is preferable to arrange the transverse grooves 7 at the left and right sides of the equatorial line 52 of the tire such that the transverse grooves are point symmetrical with respect to a point on the equatorial line 52 of the tire as shown in FIG. 21.

As described above, in order to alleviate the uneven wear and improve the tire wear life, it has been the common practice to interchange the mounting position of the tire. Such interchange of the mounting position of the tire often makes the rotating direction of the tire reversed. The use of the above mentioned point symmetry provides the important advantage that the noise can uniformly be reduced and the uneven wear can uniformly be alleviated.

In the present invention, the dimension of various parts of the tire under the inflated condition thereof with the internal pressure applied therein were measured under the following conditions. That is, a new tire was mounted on a corresponding standard rim and inflated by applying a maximum internal pressure of a ply rating and left as it was at a room temperature for more than 24 hours and then the dimensions of various parts thereof were measured at a room temperature. In this case, use may be made of JIS Standard, TRA Standard in U.S.A. and ETRTO Standard in the order as mentioned.

As stated hereinbefore, the invention is capable of significantly reducing the noise without degrading various kinds of abilities required for various kinds of lug tires, particularly without degrading overall durability, steering stability and antiskid property.

In carrying out the invention into effect, it is not always necessary to arrange the transverse grooves symmetrically with respect to the equatorial line of the tire, but may arrange the transverse grooves unsymmetrically with respect to the equatorial line of the tire, if necessary.

Figure 22:
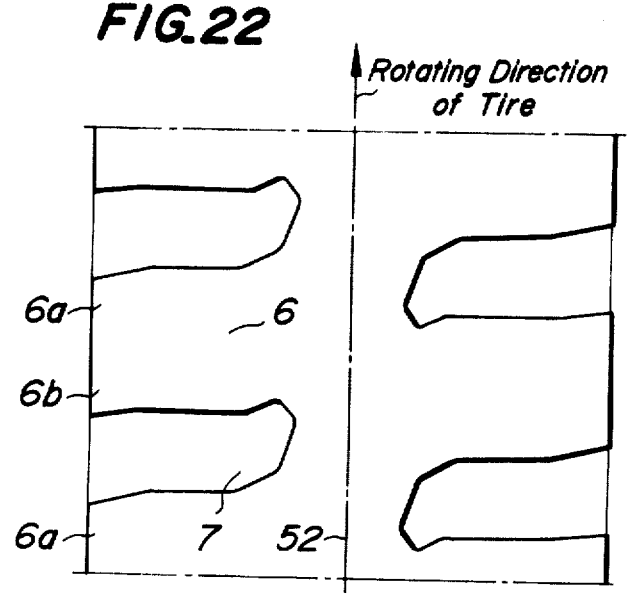

In addition, in order to further reduce the noise, the left side transverse grooves may be arranged near the right side transverse grooves. FIG. 22 shows the tire sued when vehicles run according to the traffic regulation of keeping the running vehicles to the left.

Figure 23:
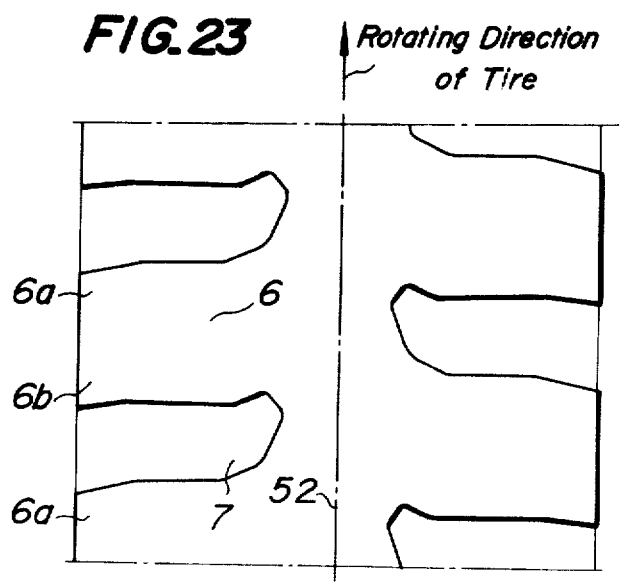

Moreover, in the case of special vehicles which do not require interchange of the mounting position of the tire, or in the case of making the rotating direction of the tire always constant, the transverse grooves 7 may be arranged as shown in FIG. 23 for the purpose of still further reducing the noise.

What is claimed is:

1. In a lug tire comprising a number of lugs circumferentially arranged along the periphery of a tread and spaced apart from each other and a number of transverse grooves which are the same in number as said lugs and delimiting said lugs, each of said transverse grooves being opened to only one of two shoulders of the tire and arranged at the left and right sides of the equatorial line of the tire and forming a pair of transverse grooves, each of said transverse grooves having a ratio Wg/Wl of equal to or smaller than 1.0 where Wg is a width of said transverse groove measured at a periphery passing a midpoint between the equatorial line of the tire and the shoulder of the tire and Wl is a width of said lug measured in the same manner as Wg, the improvement comprising; sides of left and right tread halves are divided by said equatorial line which is distant apart from a center line of a road defined by traffic regulations in order to reduce noise to the side of the road closest to the side of the road driven on, each of said transverse grooves as a whole is not inclined toward said opening thereof at a kickout side of each lug, but inclined toward said opening thereof at a stepin side of each lug at an angle of at most 22°, said angle being formed between a segment for connecting two ends of a center line of said transverse groove passing midpoints of widths of said transverse groove measured along the periphery of said tread on the one hand and the meridian line of the tire on the other hand, each portion of said center line of said transverse groove in a substantially total region of a length L of said transverse groove extending along the meridian line of the tire inclined with respect to the meridian line of the tire at an angle within a range from at most 15° measured in a direction opposite to said inclined direction of said transverse groove as a whole to at most 60° measured in the same direction as said inclined direction and each portion of said center line of said transverse groove in a region extending at least 60% of said length L of said transverse groove is inclined with respect to the meridian line of the tire at an angle as defined above and within a range from at most 2° measured in a direction opposite to said inclined direction of said transverse groove as a whole to at most 30° measured in the same direction as said inclined direction, and in a region extending from the inner end of each of said transverse grooves to a position which is at least 75% of the length L of said transverse groove, said inclination of said transverse groove as a whole at the stepin side of each lug toward said opening of each of said transverse grooves is increased in response to the advance of tread wear, the groove center line is inclined away from the direction of advancement to facilitate the escape of air on the side of the vehicle closest to the curb or further from the center line of the road, and a slope is given to groove sidewalls to maintain the escape of air during wear life of the tire.

2. The lug tire according to claim 1, wherein an angle formed between a segment for connecting a crossing point X where the outer contour curve of a tread or its extension line crosses with a transverse groove wall or its extension line to a crossing point Y where an extension line of the transverse groove wall crosses with an extension line of the groove base on the one hand and a normal line drawn perpendicular to the outer contour curve of said tread and passing through said crossing point X on the other hand in a radial sectional plane of said transverse groove at near the midpoint between the equatorial line of the tire and the shoulder thereof and measured at the stepin side of said lug is larger than that measured at the kickout side thereof by at least 8°.

3. The lug tire according to claim 1, wherein said transverse groove wall angle located at near the shoulder and measured at the kickout side of said lug is larger than that measured at the stepin side thereof by at least 4°.

4. The lug tire according to claim 1, wherein said groove wall of said transverse groove located near the shoulder is provided at the kickout side of each lug with a projection having a convex surface facing the groove base.

5. The lug tire according to claim 4, wherein a top point of said projection is vertically spaced apart from the tread surface by a distance which is 20 to 30% of a depth of the transverse groove measured from the tread surface.

* * * * *